(12) United States Patent
Kochhar et al.

(10) Patent No.: US 10,360,293 B2
(45) Date of Patent: Jul. 23, 2019

(54) DECOUPLING AND RELOCATING BOOKMARKS AND ANNOTATIONS FROM FILES

(71) Applicant: AirWatch LLC, Atlanta, GA (US)

(72) Inventors: Arjun Kochhar, Bangalore (IN);
Lakshmikanth Raju, Bangalore (IN);
Manjunath Bhat, Bangalore (IN);
Gerald T. Murphy, Atlanta, GA (US);
Marcos Raul Mendez, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 16/002,293

(22) Filed: Jun. 7, 2018

(65) Prior Publication Data

US 2018/0307660 A1 Oct. 25, 2018

Related U.S. Application Data

(63) Continuation of application No. 15/156,342, filed on May 17, 2016, now Pat. No. 9,996,514.

(30) Foreign Application Priority Data

Oct. 31, 2015 (IN) .......................... 5895/CHE/2015

(51) Int. Cl.
| | | |
|---|---|---|
| *G06F 16/22* | (2019.01) | |
| *G06F 16/93* | (2019.01) | |
| *G06F 17/21* | (2006.01) | |
| *G06F 17/22* | (2006.01) | |
| *G06F 17/24* | (2006.01) | |
| *G06F 16/955* | (2019.01) | |
| *G06F 16/2458* | (2019.01) | |

(52) U.S. Cl.
CPC .......... *G06F 17/2288* (2013.01); *G06F 16/22* (2019.01); *G06F 16/2474* (2019.01); *G06F 16/93* (2019.01); *G06F 16/9562* (2019.01); *G06F 17/212* (2013.01); *G06F 17/241* (2013.01)

(58) Field of Classification Search
CPC .......................... G06F 17/241; G06F 16/9562
See application file for complete search history.

(56) References Cited

U.S. PATENT DOCUMENTS

| | | | | |
|---|---|---|---|---|
| 6,438,566 | B1 * | 8/2002 | Okuno .............. | G06F 17/30011 |
| | | | | 707/E17.008 |
| 6,957,233 | B1 * | 10/2005 | Beezer .................. | G06F 17/241 |
| 7,028,267 | B1 * | 4/2006 | Beezer .................. | G06F 17/241 |
| | | | | 715/802 |

(Continued)

*Primary Examiner* — Asher D Kells
(74) *Attorney, Agent, or Firm* — Thomas Horstemeyer, LLP

(57) ABSTRACT

Disclosed are various examples for generating, storing, and loading references separate from a file. A request can be received to generate a reference for a file. A data object can be generated corresponding to the reference. The data object can include characteristics of the file proximate to an area in the file associated with the reference. The data object can be stored in a data store associated with the file. A request can be received to open the file. The file can be loaded from the data store. The position of the reference within the file can be determined based on a stored data object. The file can be rendered including the reference at the determined position.

20 Claims, 7 Drawing Sheets

(56) References Cited

U.S. PATENT DOCUMENTS

| | | | |
|---|---|---|---|
| 9,275,052 B2* | 3/2016 | Siegel | G06F 17/3002 |
| 9,646,173 B2* | 5/2017 | He | G06Q 50/01 |
| 2005/0160355 A1* | 7/2005 | Cragun | G06F 17/241 |
| | | | 715/230 |
| 2005/0160356 A1* | 7/2005 | Albornoz | G06F 17/2288 |
| | | | 715/229 |
| 2010/0011282 A1* | 1/2010 | Dollard | G06F 17/241 |
| | | | 715/233 |
| 2012/0060082 A1* | 3/2012 | Edala | G06F 17/241 |
| | | | 715/231 |
| 2013/0117655 A1* | 5/2013 | Bennett | G06F 17/241 |
| | | | 715/229 |
| 2014/0115436 A1* | 4/2014 | Beaver | G06F 17/2288 |
| | | | 715/229 |
| 2015/0154165 A1* | 6/2015 | O'Donoghue | G06F 17/241 |
| | | | 715/230 |
| 2015/0370757 A1* | 12/2015 | Duns | G06F 17/212 |
| | | | 715/229 |
| 2018/0165255 A1* | 6/2018 | Gafford | G06F 17/21 |

* cited by examiner

500

```
        Reference Data Object {
502 ─────  "type": "Text",
504 ─────  "descriptor": "Note",
506 ─────  "textContent":["inches. It is to the right of the datum and therefore the result is a
        positive value"]
            "locationContext": {
509 ─┌─        "subSection": ["2.5 Weight and Balance"],
     │         "subSectionStart": ["The new arm of weight A"],
     │         "pageStart": 4,
     └─        "pageEnd": 4,
               "strings": [
      ┌─          {  "content": "the new arm of weight A",   "topLeft": {   "x": 207580,  "y":
      │        93029  }  },
      │            {  "content": "is 110 − 50 = 60 inches",   "topLeft": {  "x": 197519,  "y":
512 ─┤         114006  }  }
      │        ],
      └─       "images": [{
                   "width": 155,
                   "height": 155,
                   "resolution": 72,
515 ─             "topLeft": {   "x": 51008,  "y": 34188  }
               }]
             }
        }
```

FIG. 5

DECOUPLING AND RELOCATING BOOKMARKS AND ANNOTATIONS FROM FILES

CROSS-REFERENCE TO RELATED APPLICATIONS

This application is a continuation of U.S. patent application Ser. No. 15/156,342, entitled "Decoupling and Relocating Bookmarks and Annotations from Files," filed May 17, 2016, which is hereby incorporated by reference.

BACKGROUND

When working in a file, a reference can be created and stored within the file. In one example, pilots can create references in files related to upcoming travel assignments. When circumstances change, such as the weather, the pilot can receive new versions of the files. However, the references in the prior version of the file are stored within the file. When a pilot receives a new version of the file from a computing environment, the new version of the file omits any references added in the earlier version that is locally stored in a client device of the pilot.

Another user can modify text in the file that corresponds to a reference created by the pilot. Because the reference is stored on a client device of the pilot within the file, the other user is unaware that the pilot created a reference for the text being modified. The pilot can receive an updated version of the file omitting text corresponding to a reference the pilot generated the earlier version of the file.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a sample data object corresponding to a reference according to various examples of the present disclosure.

DETAILED DESCRIPTION

Figure 1:
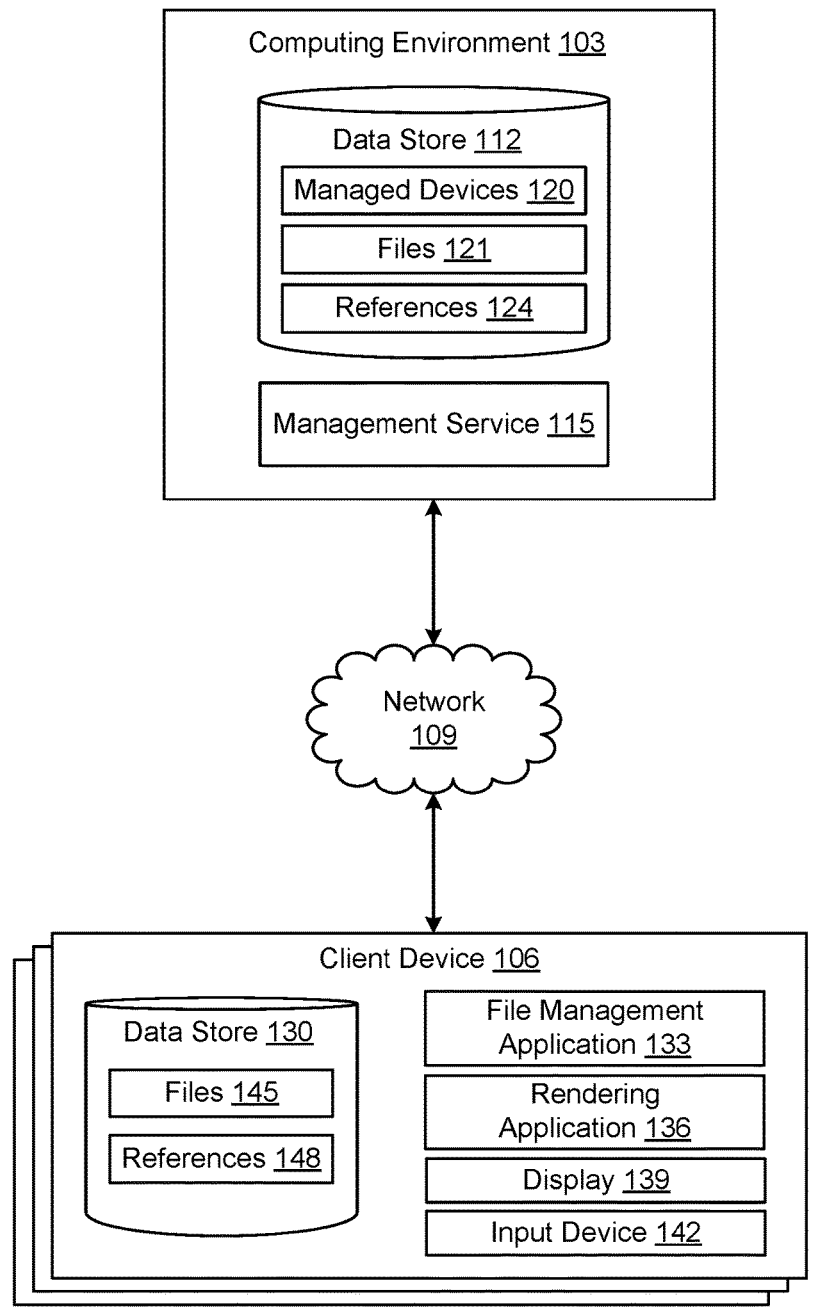
FIG. 1 is a drawing of a networked environment according to various examples of the present disclosure.

The present disclosure relates to generating a reference for a file and storing the reference decoupled from the file. According to one example, an airline employee creates a file related to an upcoming flight, such as a flight manual document. The airline employee uploads the file to a server. The server distributes the file to a client device associated with a pilot. The pilot reviews the file and creates notes, bookmarks, or other references for the file. The client device saves the references separate from the file. When the pilot later reviews the files prior to the flight, a rendering application places the references in the file.

Information about the flight can change before the scheduled flight occurs. An airline employee can update the file to reflect any changes that occur, which may cause the location of the references within the file to change. The updated file can be uploaded to the computing environment and distributed to the client device. When the pilot opens the updated file, the rendering application can place the references from the original file in the updated file. The pilot can review the updated file without losing the references that the pilot added in the original file.

In one example, a rendering application executing on a client device receives a request to generate a reference within a file. For example, the rendering application can allow a user to create a bookmark or reference within a file. When rendering the file on a display of the client device, the rendering application can identify characteristics of the data object and can superimpose the references onto the rendering of the file based on the characteristics. That is, the characteristics of the data object can be used by the rendering application to determine one or more positions within the file where the references should be superimposed. In one example, the characteristics are proximate to where the reference was created, such as the text strings preceding and subsequent to the reference.

The rendering application can transmit the data object to a file management application. The file management application can store the data object in a data store. The data object can be stored separate from the file. The reference can be a bookmark, an annotation, or another type of reference. The characteristics of the file that are within the data object can include an indication of whether the reference is a bookmark, an annotation, or another type of reference. The characteristics of the reference can also include a section, a subsection, an original page number, a page size, a text string preceding the area, a text string subsequent to the area, a reference type, a location relative to an image, a name of the file, a version number of the file, and other characteristics.

Another user can update the file using another client device, for example, another user can make changes to a first version of a file. The client device can upload the updated file to a server. As an example, if information in a file about a flight changes, an employee from the airline can update the file with the information that has changed. The file management application can receive the updated file from the server and store the updated file in a data store, for example, as a second version of the file. The rendering application can receive a request to open the updated file. The reference application can request the updated file from the file management application. The file management application can load the updated file and data objects representing references associated with the file from the data store. In one example, the data objects correspond to a first version of the file. The file management application can send the updated file and the data objects to the rendering application. According to one example, the file management application sends the second version of the file and data objects corresponding to the first version of the file to the rendering application. The rendering application can determine a position in the updated file to place each of the references based on the data objects. The rendering application can render the updated file along with the references.

According to one example, the rendering application can determine if more than one potential position to place a reference exists within an updated file. If only one potential position exists within the updated file, the rendering application can place the reference at the potential position within the updated file. If more than one potential position exists, the rendering application can generate a score for each of the potential positions based on the data object associated with the reference. The rendering application can select one of the potential positions based on the scores.

When a request to open a file is received by the rendering application, the file management application can retrieve data objects corresponding to references from a data store. As an example, the file management application can load the data objects by querying the data store and placing the returned data objects into local memory. The file management application can identify which of the references are associated with the file. According to one example, the file management application queries the data store for all references with a unique identifier corresponding to the file. The rendering application can determine a position in the file to place the references based on the characteristics associated with the data objects. The rendering application can render the file including the references, such as by overlaying or superimposing the references onto the file when the file is rendered in a user interface on a display.

With reference to FIG. 1, shown is a networked environment 100 according to various examples. The networked environment 100 shown in FIG. 1 includes a computing environment 103, a client device 106, and potentially other components, which are in data communication with each other over a network 109. The network 109 includes, for example, the Internet, intranets, extranets, wide area networks (WANs), local area networks (LANs), wired networks, wireless networks, other suitable networks, or any combination of two or more networks. The networks can include satellite networks, cable networks, Ethernet networks, telephony networks, or other types of networks.

The computing environment 103 can include, for example, a server computer or any other system providing computing capabilities. Alternatively, the computing environment 103 can employ multiple computing devices that may be arranged, for example, in server banks, computer banks, or other arrangements. The computing devices can be located in a single installation or may be distributed among many different geographical locations. For example, the computing environment 103 can include multiple computing devices that together form a hosted computing resource, a grid computing resource, and any other distributed computing arrangement.

In some cases, the computing environment 103 operates as at least a portion of an elastic computing resource where the allotted capacity of processing, network, storage, or other computing-related resources may vary over time. The computing environment 103 can also include or be operated as virtualized computer instances that are executed in order to perform the functionality that is described herein. Generally, the computing environment 103 can be operated in accordance with particular security protocols such that it is considered a trusted computing environment.

Various systems can be executed in the computing environment 103. Also, various data is stored in a data store 112 that is accessible to the computing environment 103. The data store 112 shown in FIG. 1 can be representative of multiple data stores 112. The data stored in the data store 112 is associated with the operation of the various components described below.

A management service 115 and other services can be executed in the computing environment 103. The management service 115 can manage and oversee the operation of one or more client devices 106. The management service 115 can manage access to the files 121 and the references 124 from various client devices 106. That is, the management service 115 can determine whether a user, a device, or a pairing of a user and a device are authorized to access a file 121 or a reference 124 based on access rights. In one example, access rights are compliance rules that can be determined at the time of the access request. The management service 115 can provide files 121 and references 124 to authorized client devices 106. The management service 115 can also manage and oversee files 121 and references 124 stored in data store 112.

The management service 115 can facilitate enrollment of a client device 106 on behalf of a user account. In one example, an employer can operate the management service 115 to ensure that the client devices 106 of its employees operate in compliance with the security policies. In another example, an employer can configure the management service 115 to enforce different policies (or no policies at all) based upon which users or employees are currently logged into or otherwise operating the client device 106. The management service 115 can also facilitate access to email, calendar data, contact information, and other resources provided by the computing environment 103 or accessible on the client device 106.

According to one example, a client device 106 must have a user account validated by the management service 115 in order to access the files 121. The management service 115 can restrict permissions for the client device 106. For example, an employer can grant a first user account read and write access to a file 121, while granting only read access for the file 121 to a second user account. In this example, the management service 115 can authorize the first user account to read and write to the file 121 while restricting the second user account to only reading the file 121. The management service 115 can provide the file management application 133 with access to files 121 that are authorized by the management service 115 for the user account.

The client device 106 is representative of multiple client devices 106 that can be coupled to the network 109. The client device 106 can include, for example, a processor-based system such as a computer system. The computer system can be exemplified in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 can include a data store 130, a file management application 133, a rendering application 136, and other components. The client device 106 can include a display 139 as well as input devices 142, such as a mouse, touch pad, or touchscreen that facilitates a user input or other types of data input into the client device 106.

The client device 106 can execute the file management application 133, the rendering application 136, or other components. The file management application 133 can access, manage, edit, or perform other functions with respect to files, such as files 145, references 148, and other files. As examples, a file 145 can include an image, a video, a word processing document, a spreadsheet, a PDF, an eBook, and other files. The rendering application 136 can present files to a user by generating a user interface. For example, the rendering application 136 can render the files 145 with the corresponding references 148 overlaid or superimposed on the rendered file, such as in a user interface displaying the file 145. In addition, the rendering application 136 can facilitate editing of the contents of a file 145. The rendering application 136 can also allow a user to create a reference 148 corresponding to a file 145.

The data store 130 can include files 145 and references 148. According to one example, the client device 106 is associated with a user account authenticated by the management service 115. The file management application 133 can transmit an authentication credential to the management service 115 to authenticate the client device 106. Once authenticated, the management service 115 can provide the file management application 133 with access to files 121 and references 124 that are associated with a user account corresponding to the client device 106.

The managed devices 120 can include information regarding the client devices 106 that are managed and controlled by the management service 115. The managed devices 120 for a particular client device 106 can include, for example, the identification of a user assigned to the client device 106, the identification of applications that are installed in the client device 106, historical data regarding the operation of the client device 106, and other information.

In addition, the managed device 120 for a particular client device 106 can include one or more device profiles. A device profile can comprise a set of compliance rules that can be specified by the management service 115. The management service 115 can assign various compliance rules to a client device 106, a user account associated with the client device 106, or to a pairing of the client device 106 and the user account associated with the client device 106.

The compliance rules can specify conditions that must be satisfied for a client device 106 to be deemed compliant with the compliance rule. In one example, a compliance rule can specify that particular applications are prohibited from being installed on a client device 106. In another example, a compliance rule can specify that a lock screen is required to be generated when the client device 106 is "awoken" from a low power (e.g., "sleep") state and that a passcode is required for a user to unlock the lock screen. Additionally, some compliance rules can be based on time, hardware configuration, software configuration, geographical location, network properties, or other predefined conditions.

When the compliance rules for a particular device profile are satisfied, the management service 115 can determine that the corresponding client device 106 is compliant with the device policy. For instance, a client device 106 can satisfy a compliance rule when a client device 106 is located within a particular geographic location. In one example, a client device 106 can satisfy a compliance rule when the client device 106 is in communication with a particular network 109, such as a particular local area network that is managed by the computing environment 103. Furthermore, a compliance rule in another example can be satisfied upon the time and date matching specified values.

Another example of a compliance rule involves whether a user belongs to a particular group of authorized users. A compliance rule can include a whitelist or a blacklist that specifies whether particular users or groups of users are authorized users. In various examples, the computing environment 103, the client device 106, or a combination of both the computing environment 103 and the client device 106 can determine whether a client device 106 satisfies a compliance rule.

In some examples, a company can operate the management service 115 to ensure that the client devices 106 of its users satisfy respective compliance rules. By ensuring that the client devices 106 of its users are operating in compliance with the compliance rules, the company can control access to resources to thereby improve the security of client devices 106 associated with the company and the users of the client devices 106. The file management application 133 can read and write to files 145 and references 148. In one example, the file management application 133 receives files 121 and references 124 from the management service 115 and stores the items in files 145 and references 148, respectively. The file management application 133 can perform a sync of files 145 with any files 121 associated with a user account authenticated for the client device 106. The file management application 133 can also perform a sync of references 148 with any references 124 associated with any files 145. The file management application 133 and rendering application 136 can be used to create, access, edit, or perform other functions with respect to a file 145.

According to one example, the management service 115 can restrict the file management application 133 from transferring a new version of a file 145 to files 121 if the user account is limited to read only access. In one example, the file management application 133 is still able to write changes to the file 145 locally on the client device 106 when the user account is not authorized for write permissions. In another example, the file management application 133 prevents the file 145 from being saved if the user account is not authorized to write to the file 145. The file management application 133 can query the management service 115 to determine permissions for the user account.

Multiple versions of a file 121 and 145 can be stored in the data stores 112 and 130. According to one example, a single file 121 or 145 stored in data store 112 or 130 can include more than one version of the file 121 or 145. In another example, multiple versions of a single file 121 or 145 can be stored in data store 112 or 130 as separate entries. The changes occurring from one version to the next version of a single file 121 or 145 can be stored as a difference from the one version to the next version. In this example, the multiple versions can be stored collectively as a single entry in files 121 or 145 including an original file and differences between each version.

The files 121 and 145 can include metadata describing versioning information for stored files. The metadata can include a list of versions, a latest version, a current version, authors, last modified date, last synced date, a unique identifier, and other properties of the files 121 and 145. The unique identifier can be shared between the files 121 and 145. In one example, a single file that is stored in both files 121 and files 145 has the same unique identifier in both files 121 and 145. The unique identifier can also be shared between versions of a file 121 and 145. The unique identifier can include a file component and a version component. For example, two versions of a file 121 or 145 can have the same file component of the unique identifier, but have different version components. As an example, a first file 121 can have a unique identifier including a file identifier set to 1527 and a version identifier set to 1 while an updated version of the file 121 can have a unique identifier including a file identifier set to 1527 and a version identifier set to 2.

The files 121 and 145 can include documents in various formats including Microsoft Office formats, such as files generated in Word, Excel, PowerPoint, OneNote, Publisher, or Visio; Portable Document Format (PDF); Rich Text Format (RTF); Plain Text Documents (TXT); Comma Separated Values (CSV); Extensive Markup Language (XML); OpenOffice formats, such as file formats generate by Writer, Calc, Draw, Impress, Math, and Chart; and other formats. Each reference 124 or 148 can be stored as a Java Script Object Notation (JSON) object, stored as multiple data fields, or stored in another structure. In one example, the file management application 133 converts multiple stored data fields into a JSON object when loading from the data store 130.

The rendering application 136 can render a user interface on the display 139. The rendering application 136 can receive inputs from input device 142. The rendering application 136 can also communicate with the file management application 133. In one example, the file management application 133 and the rendering application 136 both have access to a portion of memory of the client device 106. In another example, the file management application 133 and the rendering application 136 communicate through a socket connection. In yet another example, the file management application 133 and the rendering application 136 communicate by making remote procedure calls or other inter-application communication mechanisms provided by an operating system of the client device 106.

The file management application 133 can transmit a list of files 145 to the rendering application 136. The rendering application 136 can render a user interface that includes the list of files 145. In response to a user selection of a file 145, the rendering application 136 can transmit a request to the file management application 133 for the selected file 145. The file management application 133 can retrieve the stored file 145 including any references 148 associated with the file 145 from the data store 130. As an example, the file management application 133 can query the data store 130 for the file 145 and references 148 and place the file 145 and references 148 into local memory.

The file management application 133 can initiate the process of storing an encrypted version of a file 121 or 145, or a reference 124 or 148, for various reasons. For example, in some examples, the file management application 133 can initiate the process in response to a request from the user of the client device 106 to "save" the file 145. In another example, the process can be initiated in response to a user of the client device 106 requesting to "share" the file 145 with another user. In this example, the encrypted file 145 can be transmitted to the management service 115 and stored in data store 112 as file 121. The file management application 133 can also encrypt any references 148 in the file 145 and transmit the encrypted references 148 to the management service 115. The management service 115 can transmit the encrypted file 121 to the other user. In an alternative example, the data store 112 can be the default storage used by the file management application 133, and the file management application 133 can initiate the process of storing an encrypted version of the file 121 in the data store 112 automatically in response to the file being created or saved.

Upon determining that an encrypted version of a file 121 is to be stored in the data store 112, the client device 106 can begin encrypting the file 121. In some examples, the encryption key and encryption algorithm used by the client device 106 can be specified by the management service 115. In an alternative example, the client device 106 can transmit the file to the management service 115, and the management service 115 can encrypt the file 121.

The rendering application 136 can receive a request from a user to generate a reference 148 for a file 145. The request can be a request to create an annotation, a bookmark, or other reference 148. In one example, a section of text can be highlighted by the user. In another example, a freehand drawing can be received from the user. The freehand drawing can include points within the file 145. In one example, the points are an array of points along a line and the freehand drawing also includes a width of the line and a color of the line.

According to one example, the rendering application 136 can facilitate a selection of whether to apply a reference 148 in future versions of a file 145, such as upon creation of the reference 148. The rendering application 136 can store the selection with the reference 148. The rendering application 136 can include or exclude a reference 148 in a future version of a file 145 in response to the user selection. Upon creation of a reference 148, the reference 148 can be associated with compliance rules. The user accounts that are authorized to make changes to current or future file versions can be determined. In one example, the rendering application 136 prompts a user for authorized user accounts. In another example, the management service 115 determines which user accounts are authorized to make changes to current or future file versions, such as based on data in managed devices 120.

The rendering application 136 can generate a visual indication of the data associated with the request. For example, the rendering application 136 can highlight text selected to create a reference 148. In another example, the rendering application 136 can generate a line with a predetermined color and thickness on the display connecting points received from the input device 142. The rendering application 136 can generate a user interface to facilitate adding the reference. The user interface can include user interface elements to receive input parameters along with the request to add the reference. According to one example, when a section of text is selected through the input device 142, the rendering application 136 displays the text as highlighted on the user interface. In this example, the user interface includes a user interface element to add a reference 148. When a user selects the user interface element, the rendering application 136 receives the request to generate the reference 148.

The rendering application 136 can generate a data object for the reference 148 in response to the request to add the reference 148 to file 145. The data object can include a unique identifier and characteristics of the file 145. After the request to generate the reference 148 is received, the rendering application 136 determines the characteristics from the file 145 to include within the data object. The number of characteristics that the rendering application 136 determines can be configurable. In one example, the rendering application 136 can determine six characteristics. The characteristics can include a starting page and an ending page of the reference 148. The characteristics can also include strings and images located within a predetermined distance of the reference 148 and a location of the strings and images. In one example, the characteristics include a resolution of an image proximate to the reference 148. The characteristics can also include a section or a subsection within the file 145 and at least a portion of the name of the section or subsection.

The rendering application 136 can transmit the data object for the reference 148 to the file management application 133. The file management application 133 can store the data object for the reference 148 in data store 130 separate from the file 145. The stored reference 148 can correspond to multiple files 145. In one example, when the file 145 that a reference 148 was created in is loaded, the file management application 133 also loads the reference 148 and transmits the file 145 and reference 148 to the rendering application 136.

According to one example, a pilot creates a reference 148 on a client device 106 in a file 145. In this example, the file 145 includes a detailed flight plan for an upcoming flight, and the reference 148 is an annotation regarding the preflight checklist. An airline employee updates the detailed flight plan from a remote client device 106 after the reference 148 is generated, and the management service 115 transfers the updated detailed flight plan to the file management application 133. The pilot opens the updated detailed flight plan using the rendering application 136. The rendering application 136 transmits a request to open the updated detailed flight plan to the file management application 133. The file management application 133 transmits the updated detailed flight plan and the annotation corresponding to the earlier version of the detailed flight plan to the rendering application 136. The rendering application 136 determines where to put the annotation in the updated detailed flight plan based on the characteristics stored with the annotation.

The management service 115 can transfer references 124 to a client device 106 corresponding to a file 145 stored on the client device 106. The file management application 133 can store the references 124 as references 148. In one example, the references 148 are third party references that are not associated with a user account corresponding to the client device 106. The references 148 can be references generated by another user on another client device 106 in the file 145. In this example, the rendering application 136 does not place the references 148 in the file 145 when rendering the file 145 for a user. However, other references 148 may be associated with the user account corresponding to the client device 106. The rendering application 136 can render the file 145 including the other references 148 in the file 145, but omitting the references 148 not associated with the user account.

The rendering application 136 can generate a prompt to facilitate a selection of references 148. For example, the rendering application 136 can generate a user interface including a list of references 148. The user interface can include a user interface element corresponding to each of the references 148 in the list. The user interface elements can facilitate selection or deselection of the references 148. The rendering application 136 can render the file 145 including any selected references 148 overlaid or superimposed on the file 145. The prompt can facilitate selection of references 148 based on user account. For example, a user can select to render the file 145 with references 148 created by a first user and an administrative user while omitting references 148 created by a second user. In one example, the rendering application 136 can store the user selection with the file 145 or the reference 148. In another example, a user selection can be stored as a user preference, such as in managed devices 120.

According to one example, the rendering application 136 limits the list of references 148 included in a prompt to references 148 that were created by other users or created on other client devices 106. The rendering application 136 can omit the prompt or omit a reference 148 from the list of references 148 if the user account associated with the client device 106 creates the reference 148. In another example, the rendering application 136 can also omit the reference 148 if the user account created the reference 148 on another client device 106. In this example, the rendering application 136 can render the file 145 including any references 148 created by a user account associated with the client device 106 and any references 148 selected by the user and created by other user accounts.

The rendering application 136 can select which references 148 to overlay or superimpose on a display of a file 145 based on user preferences. For example, the rendering application 136 can include references 148 based on user preferences without user interaction. The user preferences can include a previous indication of whether to include or exclude a reference. For example, the rendering application 136 can include references 148 that the user previously selected for inclusion. The rendering application 136 can also omit references 148 that the user previously selected for exclusion.

The rendering application 136 can include references 148 created by authorized users. In one example, the authorization of a user can be determined by the management service 115. The management service 115 can determine whether a user account has access rights for a file 121 or 145. In another example, the authorized users can include users selected by a user of the client device 106. For example, a user can select to share a file 145 with another user account or authorize access to a file 145 for another user account.

The rendering application 136 can identify elements of the file 145 corresponding to the references 148 not associated with the user account. The elements can include a section of text, an image, a heading, or other elements. The rendering application 136 can warn the user of the client device 106 if the user attempts to edit or delete one of the elements in the file 145. For example, the rendering application 136 can generate a warning informing the user that another user has generated a reference 148 in the file 145. The rendering application 136 can require the user to submit a confirmation of the edits or deletions prior to allowing the user to edit or delete the element.

Figure 2:
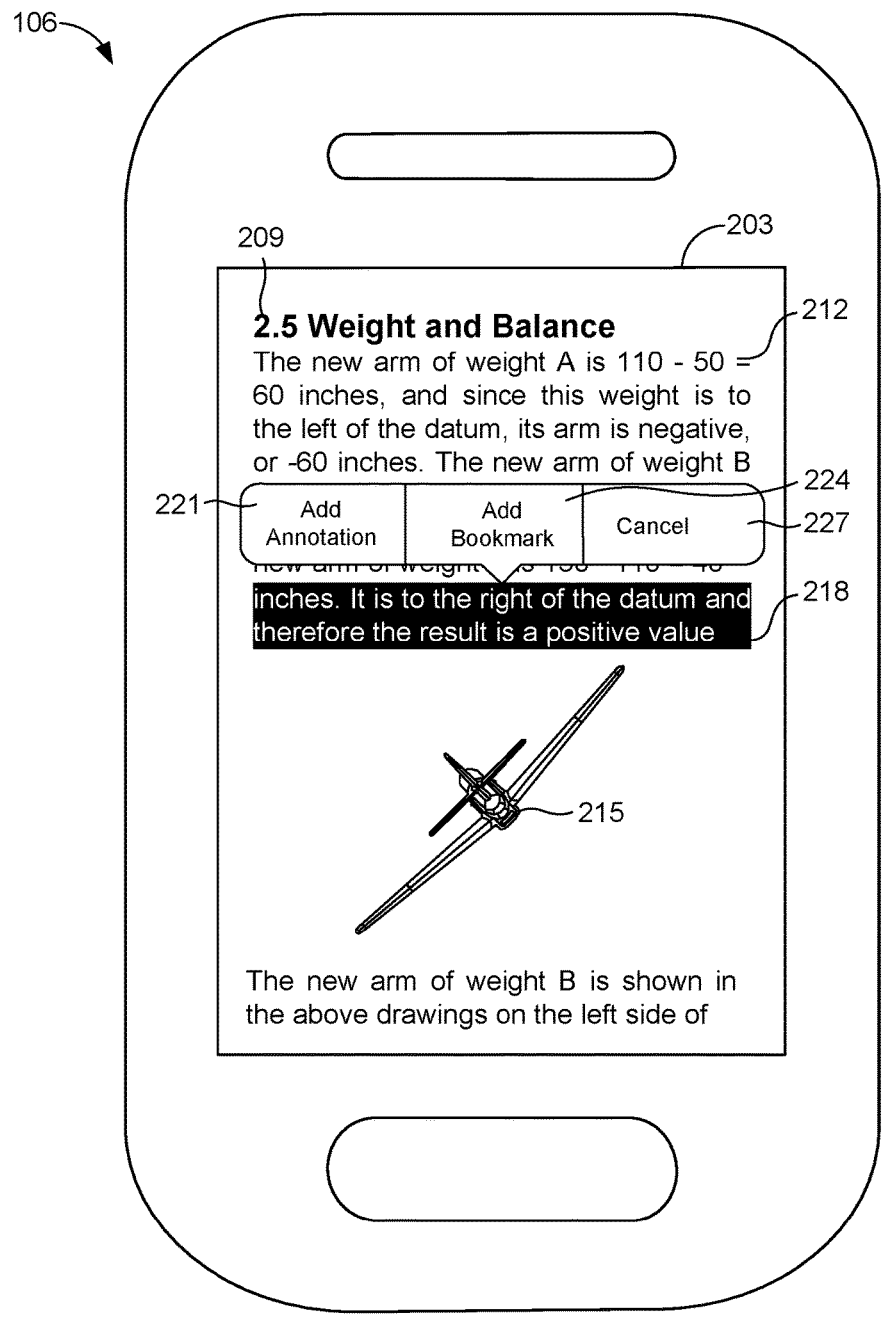
FIGS. 2-4 are pictorial diagrams of example user interfaces rendered by a client in the networked environment of FIG. 1 according to various examples of the present disclosure.

Turning to FIG. 2, shown is a pictorial diagram of an example user interface 203 generated by the rendering application 136. The rendering application 136 can render a file 145 within the user interface 203. For example, the rendering application 136 can render a Plane Mechanics file for a pilot on a client device 106. A pilot can add references 148 to the Plane Mechanics file that are saved separate from the file 145. The rendering application 136 can include the references 148, which was added in one version of the file 145, in another version of the file 145. In one example, the reference 148 was generated in a later version of the file 145, and the rendering application 136 included the reference 148 when opening an earlier version of the file 145.

The user interface 203 illustrates a file 145 including a subsection 209, a text 212, and an image 215. A portion of text 218 can be selected on the client device 106. For example, if a pilot wants to add a reference 148 to text in subsection "2.5 Weight and Balance," the pilot presses and holds a finger on the text 212 to initiate selecting of the portion of text 218. The pilot drags the text selection with the finger to include the portion of text 218 and then releases the finger from the display 139. When the portion of text 218 is selected, the rendering application 136 can display several options on the user interface 203, such as an add annotation button 221, an add bookmark button 224, and a cancel button 227.

When the add annotation button 221 is selected, the rendering application 136 can display a text input field to receive an annotation for the selected text. The rendering application 136 can display a keyboard on the display for a user to enter text, utilize a physical keyboard, use a remote keyboard such as a Bluetooth keyboard, or utilize another text entry device. Once the annotation is finalized, the rendering application 136 receives a request to add the reference 148. For example, when a pilot finishes adding an annotation, the pilot presses a "Save" button to finalize the annotation.

When the add bookmark button 224 is selected, the rendering application 136 can generate a data object for the bookmark to add the bookmark as a reference 148. In one example, the rendering application 136 prompts the user for a name of the bookmark prior to adding the bookmark. The cancel button 227 can be selected to remove the options from the user interface 203. In one example, selecting the cancel button 227 also causes the rendering application 136 to deselect the portion of text 218.

The rendering application 136 can generate a data object for the requested reference 148. According to one example, when a pilot finalizes adding an annotation to the portion of text 218, the rendering application 136 receives a request to add the annotation from an operating system on the client device 106. The operating system can make a call to a function of the rendering application 136 in response to a selection of a user interface element. The rendering application 136 generates a data object for the annotation including a type field set to "Text," a descriptor field set to "Note," a text content field set to the portion of text 218, search string fields containing samples of the text 212, image fields containing properties of the image 215, a location field set to a position of the portion of text 218 relative to the image 215, a subsection field set to "2.5 Weight and Balance," a start and end page field, and other characteristics of the file 145.

The rendering application 136 can transmit the data object for the reference 148 to the file management application 133. The file management application 133 can receive the data object and store the data object as a reference 148 in data store 130. According to one example, the file management application 133 also syncs the newly created reference 148 with references 124 in the data store 112. In this example, the file management application 133 can sync the reference 148 by transmitting the reference 148 to the management service 115. In one example, the rendering application 136 transmits the data object when the data object is generated. In another example, the rendering application 136 transmits the data object when the file 145 is saved.

The rendering application 136 can transmit the file 145 and any corresponding references 148 together to the file management application 133 to be saved when a user saves the file 145. The rendering application 136 can close the file 145 in response to an indication by a user to close the file. The rendering application 136 can automatically save the file 145 and any corresponding references 148 in response to the indication by the user to close the file.

Figure 3:
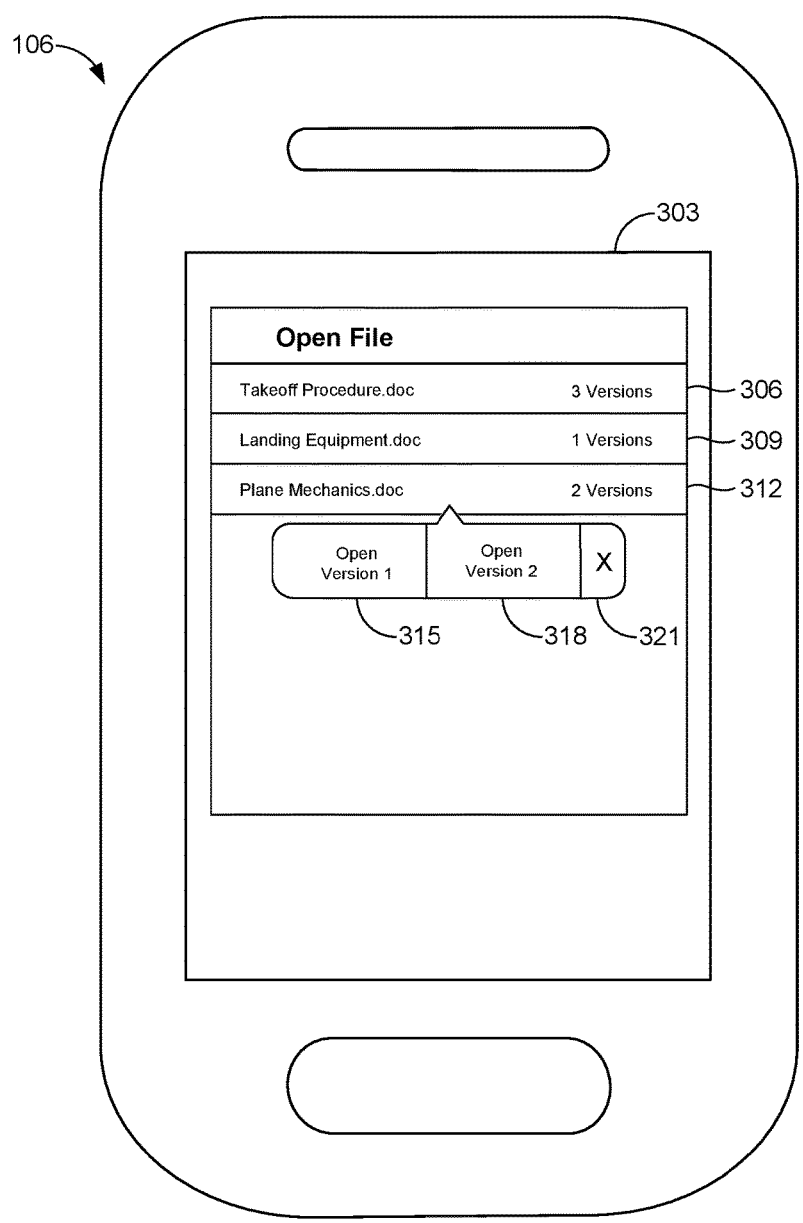

With reference to FIG. 3, shown is another example of a user interface 303 generated by the rendering application 136. The rendering application 136 can render a list of files 145 available to be opened using the user interface 303 on the display 139. According to one example, the rendering application 136 displays a "Takeoff Procedure" file 306, a "Landing Equipment" 309 file, and a "Plane Mechanics" file 312.

In one example, the rendering application 136 receives a request to open a file 145 from user interface 303. The rendering application 136 requests the file 145 from the file management application 133. The file management application 133 retrieves the file 145 from the data store 130. The file management application 133 also searches the data store 130 for any references 148 corresponding to the file 145. According to one example, a unique identifier is stored for each of the references 148 corresponding to the file 145. The unique identifier can be limited to a file component of a unique identifier for the file 145. For example, when a reference 148 is added, the reference 148 can be applicable to all versions of the file 145 for which the reference 148 is being added.

In another example, the file management application 133 processes all of the references 148 to determine which of the references 148 are applicable to the file 145. For example, when a file 145 is retrieved, the file management application 133 can search the file 145 for characteristics stored in the reference 148. The file management application 133 can perform this search for each of the references 148 to determine which of the references 148 are applicable to the file 145. A reference 148 can be applicable to a file 145 when a minimum threshold score is calculated for the reference 148. The file management application 133 can provide the references 148 to the rendering application 136, and the rendering application 136 can determine which of the references 148 are applicable to the file 145.

The user interface 303 can include version information for each of the files 145. As one example, the user interface 303 displays that "Takeoff Procedure" file 306 has three versions, the "Landing Equipment" 309 file has one version, and the "Plane Mechanics" file 312 has two versions. In this example, when a pilot selects the "Plane Mechanics" file 312, the user interface 303 displays multiple user interface element for different options related to the "Plane Mechanics" file 312. The user interface elements can include an Open Version 1 element 315, an Open Version 2 element 318, and a cancel element 321.

According to one example, when a pilot selects Open Version 2 element 318, the rendering application 136 transmits a request to open the second version of the "Plane Mechanics" file 312 to the file management application 133. The file management application 133 loads the "Plane Mechanics" file 312 from files 145. The file management application 133 also loads references 148 corresponding to the "Plane Mechanics" file 312. For example, the file management application 133 can search references 148 for a unique identifier corresponding to the "Plane Mechanics" file 312, such as a file component of a unique identifier for the file 145.

The references 148 corresponding to the "Plane Mechanics" file 312 may have been generated in either version one of the "Plane Mechanics" file 312 or version two of "Plane Mechanics" file 312. The file management application 133 can transmit the second version of the "Plane Mechanics" file 312 and the references 148 corresponding to the "Plane Mechanics" file 312 to the rendering application 136.

Figure 4:
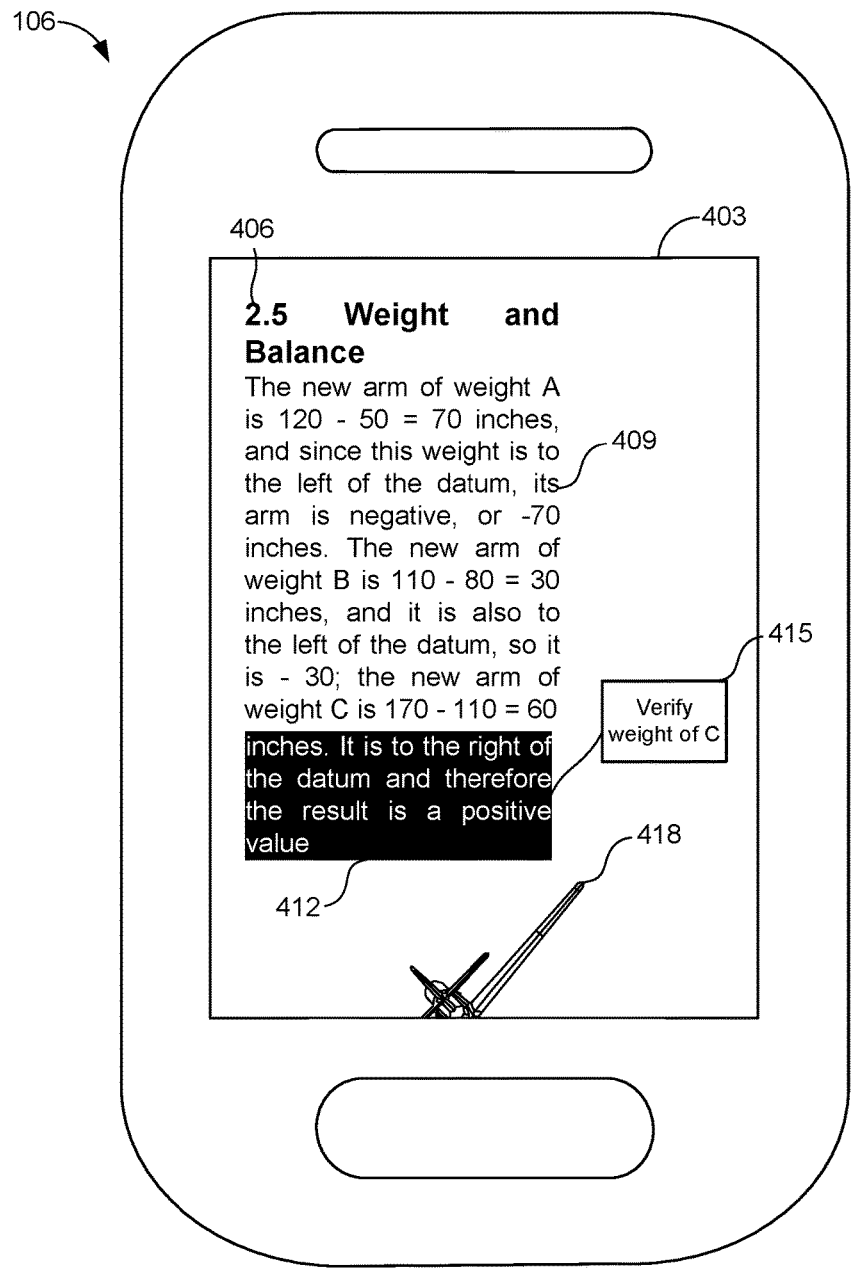

With reference to FIG. 4, shown is another example of a user interface 403 generated by the rendering application 136. According to one example, the rendering application 136 receives a request to open a second version of the "Plane Mechanics" file 312. The rendering application 136 transmits a request for the second version of the "Plane Mechanics" file 312 to the file management application 133, and receives the second version of the "Plane Mechanics" file 312 including references 148 applicable to the "Plane Mechanics" file 312.

The rendering application 136 can determine a placement for the references 148 within a file 145, such as the second version of the "Plane Mechanics" file 312, based on a data object associated with each reference 148. The rendering application 136 can generate and render the file 145 in user interface 403 including the references 148. The user interface can include a subsection 406, a text 409, a portion of text 412, an annotation 415, and an image 418. The annotation 415 can correspond to the portion of text 218.

According to one example, the rendering application 136 receives a reference 148 from the file management application 133 for the annotation 415. The reference 148 includes a data object including a type field set to "Text," a descriptor field set to "Note," a text content field set to "inches. It is to the right of the datum and therefore the result is a positive value," a search string set to "the new arm of weight A," a search string set to "is 110−50=60 inches," an image field with properties of the image 215, a location field, a subsection field set to "2.5 Weight and Balance," a start and end page field, and other characteristics of the "Plane Mechanics" file 312.

The rendering application 136 can search the file 145 for the each of the characteristics from the reference 148. According to one example, the rendering application 136 searches for the search string of "the new arm of weight A" and determines whether the string is located in text 409. The rendering application 136 also searches for search string "is 110−50=60" and fails to locate the string because the text was changed in the second version. The rendering application 136 searches for an image with properties similar to image 215 and determines image 418 shares similar properties to image 215. The rendering application 136 also searches for other characteristics contained in the reference 148. The rendering application 136 determines that the reference 148 corresponds to text 412 and adds an annotation 415 when rendering the "Plane Mechanics" file 312 on user interface 403.

When searching an updated version of a file 145, the file 145 can include more than one location that matches the characteristics of the reference. According to one example, another user updated the file 145 to contain the text "the new arm of weight A" on both page 7 and page 23. A reference application 136 can search the file 145 to place a reference 148 created for an earlier version of the file 145. In this example, a data object for the reference 148 specifies that the reference 148 is located on page 5 and includes a search string of "the new arm of weight A." The rendering application 136 can search the file 145 for "the new arm of weight A" and find the locations on page 7 and page 23.

The rendering application 136 can score each of the locations based on the completeness of matching the data object. The rendering application 136 can calculate a higher score for the location on page 7 than for the location on page 23 because the location at page 7 is closer to where the reference 145 was originally generated. The rendering application 136 can also give a greater negative weight for the score of a potential location if the rendering application 136 fails to locate a search string field near the location because the text of the file 145 may be more likely to change than the subsection of a reference 148. The rendering application 136 can give a greater weight to the similarity of the text content field to the text in a potential location or to a potential location being within the subsection. The rendering application 136 can place the reference 148 at the location having the highest score.

In some examples, the rendering application 136 can score each page or potential location in a document 145 for a reference 148 based on characteristics of the reference 148. To calculate the score for each page or potential location, the rendering application 136 can generate a score for each characteristic that is found in the document 145. The score for the each characteristic can be based on the proximity of a potential location of the characteristic to the original position of the characteristic when the reference 148 was created. The rendering application can also base the score for a characteristic on the proximity to the other characteristics that are found in the document 145. The rendering application 136 can determine the score for each page or potential location based on a sum or average of the scores for each characteristic that is found on the page or within a configurable distance to the potential location.

In one example, the score for each page is a floating value between zero and one, with one being the highest score. When a score for all pages or potential positions falls below a preconfigured threshold, the rendering application 136 can refrain from rendering the reference 148 in the document 145. The rendering application 136 can notify a user that the reference 148 is omitted. As an example, the rendering application 136 can display a pop-up notification to inform the user that a reference 148 was omitted.

With reference to FIG. 5, shown is an example data object 500 corresponding to a reference 148. The data object 500 includes a reference type 502, a descriptor 504, a text content 506, a subsection 509, search strings 512, and image properties 515. The reference type 502 can identify a type of a reference 148, such as a "Bookmark," "Text," "Highlight," "Freehand," "Line," or other type of reference. The descriptor 504 can provide additional information about the reference 148 such as "Note," "Highlight," "Pen," or other information. The descriptor 504 can be a user entered name or label corresponding to the reference 148.

According to one example, the data object for a reference 148 has the type set to "Highlight" and the descriptor set to "Highlight." The data object has a highlight data field including a content, an occurrence index, a text after highlight, and a position. The rendering application 136 can highlight the content within the file 145. The rendering application 136 can determine the location of the highlight if more than one potential location exists by scoring each potential location. For example, the rendering application 136 can determine if the text following a potential location matches the text after highlight value and compare the position of the potential location to the position of the highlight.

The occurrence index can be based on the number of times the highlighted text occurs on a page or within the document 145. The occurrence index can be the number of times the highlighted text occurs prior to the highlighted text plus one for the highlighted text. According to one example, the word "airline" is highlighted by a user on page three of a document 145. In this example, the word "airline" occurs fifteen times on page three of the document 145, and the fourth occurrence is selected by the user for highlight. The occurrence index can be set to four to indicate that the fourth occurrence of the word "airline."

According to one example, a data object for a reference 148 has the type set to "Line" and the descriptor is set to "Pen." The data object includes line data field including a line color, a line width, a path containing multiple coordinates within the file 145, for example (x, y) coordinates, and other data. The rendering application 136 can draw a line within the file 145 based on the data object. The rendering application 136 can draw the line with the color and width specified in the data object. The rendering application 136 can draw the line through each of the multiple coordinates specified in the data object.

When a new version of a file 145 is received, components of a data object for a reference 148 can be incorrect. The rendering application 136 can generate a completeness score for each partially matching location. The rendering application 136 can select the location corresponding to the highest score to place the reference 148.

Figure 6:
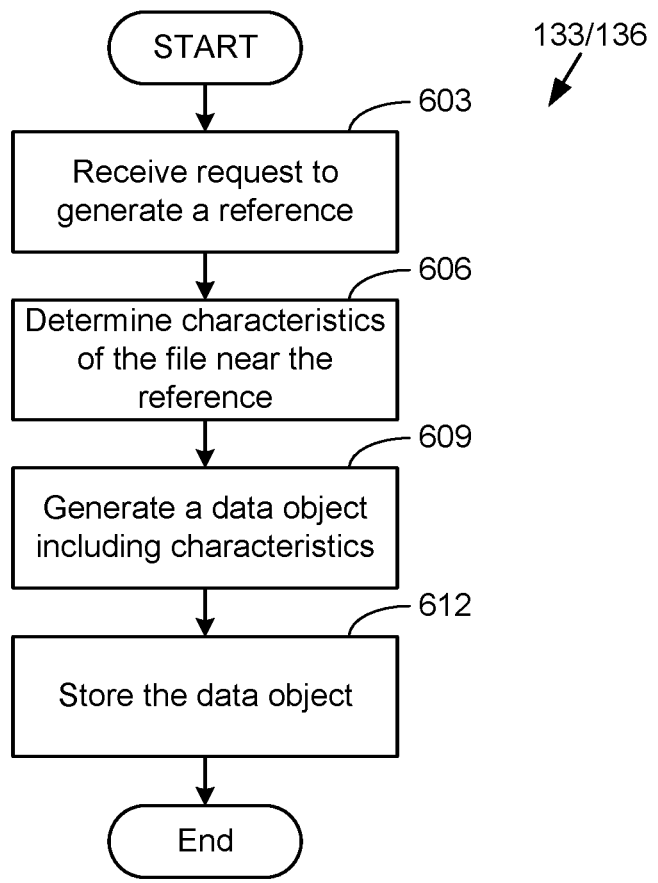
FIGS. 6 and 7 are flowcharts illustrating examples of functionality implemented as portions of a file management application and a rendering application executed in a computing environment in the networked environment of FIG. 1 according to various examples of the present disclosure.

Referring next to FIG. 6, shown is a flowchart that provides one example of the operation of a portion of the file management application 133 and the rendering application 136. As an alternative, the flowchart of FIG. 6 may be viewed as depicting an example of elements of a method implemented in the client device 106. FIG. 6 illustrates an example of how the file management application 133 and the rendering application 136 can generate a reference 148 for a file 145 when a user submits a request to add the reference 148 on the client device 106 using the input device 142.

At step 603, the rendering application 136 receives a request to generate a reference 148. The request to generate the reference 148 can be initiated in response to a selection of a user interface element using input device 142. The input device 142 can be overlaid onto display 139. As an example, a pilot can select a user interface on a touch screen device on the display 139 of the client device 106 to request the rendering application 136 to generate a reference 148. The pilot may enter details about the reference 148 prior to requesting to add the reference 148.

At step 606, the rendering application 136 determines characteristics of the file 145 near the reference 148. The rendering application 136 can search for text and images preceding and following the location at which the reference 148 is being generated. The rendering application 136 can determine characteristics of the text and images preceding and following the location. In one example, the rendering application 136 identifies an image after the requested reference 148 and determines an absolute position of the image, a position of the image relative to reference 148, a resolution of the image, a width of the image, and a height of the image.

At step 609, the rendering application 136 generates a data object including the characteristics. For example, the rendering application 136 can store properties of an image in the data object, such as the absolute position of the image, a position of the image relative to reference 148, a resolution of the image, a width of the image, and a height of the image. The data object can be in a JSON object. According to one example, the data object formatted according to the format shown for the data object 500 in FIG. 5. The characteristics can include a starting page and an ending page of the reference 148. The rendering application 136 can transmit the generated data object to the file management application 133.

At step 612, the file management application 133 can store the data object. For example, the file management application 133 can store the data object in the data store 130 as a reference 148. In one example, the data object is stored in the data store 130 as a JSON object. In another example, the file management application 133 extracts the data from the data object and stores the extracted data in the data store 130. The file management application 133 can transfer the created reference 148 to the management service 115. In one example, the file management application 133 sends a message to the management service 115 indicating a file 145 or a reference 148 is ready to be transferred, and the management service 115 pulls the file 145 or the reference 148. The management service 115 can store the received reference 148 in data store 112 as a reference 124.

Figure 7:
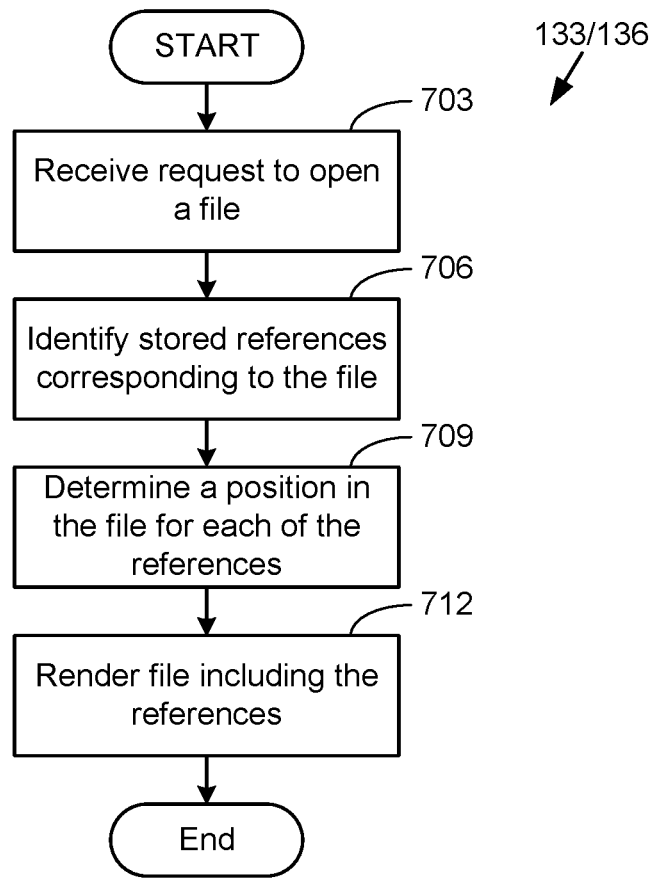

Referring next to FIG. 7, shown is a flowchart that provides one example of the operation of a portion of the file management application 133 and the rendering application 136. As an alternative, the flowchart of FIG. 7 can be viewed as depicting an example of elements of a method implemented in the client device 106. FIG. 6 illustrates an example of how the file management application 133 and the rendering application 136 can open a file 145 including references 148 corresponding to the file 145 when a user submits a request to open the file 145 on the client device 106 using the input device 142.

Beginning at step 703, the rendering application 136 receives a request to open a file 145. The request to open the file 145 can be initiated in response to a selection of the user interface element using input device 142, for example, the Open Version 1 element 315 or the Open Version 2 element 318 on the user interface 303. As an example, a pilot can select a user interface on a touch screen device on the display 139 of the client device 106 to request to open a file 145. The request can include a unique identifier for the file 145. The request can also include a version number of the file 145. According to one example, the file 145 was previously generated on the client device 106. In another example, the file 145 was previously generated elsewhere and received by the file management application 133 from the management service 115. The rendering application 136 can transmit a request to the file management application 133 for the file 145 including a unique identifier corresponding to the file 145.

At step 706, the file management application 133 identifies references 148 in data store 130 corresponding to the file 145. As an example, the file management application 133 can search the data store for references 148 having a unique identifier corresponding to the file 145. In another example, the file management application 133 loads the file 145. In this example, the file management application 133 retrieves characteristics from the data store 130 for each reference 148 and determines if the file 145 matches the characteristics. The file management application 133 can identify any references 148 having characteristics that match the file 145 as corresponding to the file 145. The file management application 133 can transmit the file 145 and any corresponding references 148 to the rendering application 136.

At step 709, the rendering application 136 can determine a position in the file 145 for each of the references 148. The rendering application 136 can receive the file 145 and any corresponding references 148 from the file management application 133. The rendering application 136 can iterate through each of the corresponding references 148 to determine a position in the file 145 for each reference 148. For example, the rendering application 136 can determine a position in the file 145 matching characteristics described in a data object corresponding to the reference 148.

At step 712, the rendering application 136 can render the file 145 including the references 148. For example, the rendering application 136 can generate the file 145 with references 148 placed at positions obtained in step 709. The rendering application 136 can render the generated file 145 including the references 148 on the display 139. According to one example, the rendering application 136 identifies a file format for the file 145 and loads a third party library corresponding to the file format to render the file 145.

The flowcharts of FIGS. 5 and 6 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 5 and 6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The computing environment 103, the client devices 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 115, the file management application 133, the rendering application 136, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A method for file referencing, comprising:
receiving a request to generate a reference for a file;
generating a data object corresponding to the reference, the data object comprising at least one characteristic of the file near the reference;
storing the data object separate from the file;
receiving a request to open the file;
searching for at least one image within the file with at least one property similar to an image identified in the data object, the at least one property comprising at least one of a width, a height, or a resolution of the at least one image;
determining a position in the file to place the reference in the file based at least in part on matching at least one of: a width, a height, or a resolution of the at least one image from the data object with an image in the file; and
rendering the file including the reference at the position.

2. The method of claim 1, wherein determining the position in the file to place the reference further comprises:
searching for at least one search string within the file, the data object comprising the at least one search string.

3. The method of claim 1, further comprising receiving a selection of a particular version of the file from among a plurality of versions of the file, wherein the position in the file is determined for the particular version of the file and the reference was generated for a different version of the file.

4. The method of claim 1, further comprising, in response to receiving the request to open the file, retrieving the data object based in part on a unique identifier corresponding to the file.

5. The method of claim 1, wherein the reference is at least one of a bookmark or an annotation, and the at least one characteristic of the file further comprises an indication of whether the reference is the bookmark or the annotation.

6. The method of claim 1, wherein determining the position in the file to place the reference comprises:
determining a number of potential positions to place the reference in the file;
in response to the number of potential positions being one position, determining the one position as the position in the file to place the reference; and
in response to the number of potential positions being a plurality of potential positions:
generating a plurality of scores individually corresponding to the plurality of potential positions based at least in part on the data object; and
determining one of the plurality of potential positions as the position in the file to place the reference based at least in part on the plurality of scores.

7. The method of claim 1, further comprising:
receiving a request to generate a second reference for the file;
generating a second data object corresponding to the second reference, the second data object comprising at least one characteristic of the file near the second reference; and
storing the second data object separate from the file.

8. A non-transitory computer-readable medium embodying a program for file referencing that, when executed by a client computing device, causes the client computing device to at least:
receive a request to generate a reference for a file;
generate a data object corresponding to the reference, the data object comprising at least one characteristic of the file near the reference;

store the data object separate from the file;
receive a request to open the file;
searching for at least one image within the file with at least one property similar to an image identified in the data object, the at least one property comprising at least one of a width, a height, or a resolution of the at least one image;
determine a position in the file to place the reference in the file based at least in part on matching at least one of: a width, a height, or a resolution of the at least one image from the data object with an image in the file; and
render the file including the reference at the position.

9. The non-transitory computer-readable medium of claim 8, wherein the program further causes the client computing device to at least:
search for at least one search string within the file, the data object comprising the at least one search string.

10. The non-transitory computer-readable medium of claim 8, wherein the program further causes the client computing device to at least receive a selection of a particular version of the file from among a plurality of versions of the file, wherein the position in the file is determined for the particular version of the file and the reference was generated for a different version of the file.

11. The non-transitory computer-readable medium of claim 8, wherein the program further causes the client computing device to at least retrieve the data object based in part on a unique identifier corresponding to the file in response to receipt of the request to open the file.

12. The non-transitory computer-readable medium of claim 8, wherein program further causes the client computing device to at least:
determine a number of potential positions to place the reference in the file;
in response to the number of potential positions being one position, determine the one position as the position in the file to place the reference; and
in response to the number of potential positions being a plurality of potential positions:
generate a plurality of scores individually corresponding to the plurality of potential positions based at least in part on the data object; and
determine one of the plurality of potential positions as the position in the file to place the reference based at least in part on the plurality of scores.

13. The non-transitory computer-readable medium of claim 8, wherein the program further causes the client computing device to at least:
receive a request to generate a second reference for the file;
generate a second data object corresponding to the second reference, the second data object comprising at least one characteristic of the file near the second reference; and
store the second data object separate from the file.

14. A system for file referencing, comprising:
a data store; and
a computing device in communication with the data store, the computing device comprising a hardware processor and the computing device being configured to at least:
receive a request to generate a reference for a file;
generate a data object corresponding to the reference, the data object comprising at least one characteristic of the file near the reference;
store the data object separate from the file in the data store;
receive a request to open the file;
searching for at least one image within the file with at least one property similar to an image identified in the data object, the at least one property comprising at least one of a width, a height, or a resolution of the at least one image;
determine a position in the file to place the reference in the file based at least in part on matching at least one of: a width, a height, or a resolution of the at least one image from the data object with an image in the file; and
render the file including the reference at the position.

15. The system of claim 14, wherein the computing device is further configured to at least:
search for at least one search string within the file, the data object comprising the at least one search string.

16. The system of claim 14, wherein the computing device is further configured to at least receive a selection of a particular version of the file from among a plurality of versions of the file, wherein the position in the file is determined for the particular version of the file and the reference was generated for a different version of the file.

17. The system of claim 14, wherein the computing device is further configured to at least retrieve the data object based in part on a unique identifier corresponding to the file in response to receipt of the request to open the file.

18. The system of claim 14, wherein the reference is at least one of a bookmark or an annotation, and the at least one characteristic of the file further comprises an indication of whether the reference is the bookmark or the annotation.

19. The system of claim 14, wherein the client computing device is further configured to at least:
determine a number of potential positions to place the reference in the file;
in response to the number of potential positions being one position, determine the one position as the position in the file to place the reference; and
in response to the number of potential positions being a plurality of potential positions:
generate a plurality of scores individually corresponding to the plurality of potential positions based at least in part on the data object; and
determine one of the plurality of potential positions as the position in the file to place the reference based at least in part on the plurality of scores.

20. The system of claim 14, wherein the computing device is further configured to at least:
receive a request to generate a second reference for the file;
generate a second data object corresponding to the second reference, the second data object comprising at least one characteristic of the file near the second reference; and
store the second data object separate from the file.

* * * * *